United States Patent [19]

Ceaser

[11] Patent Number: 4,780,518

[45] Date of Patent: Oct. 25, 1988

[54] OIL SPILL ABSORBENT MATERIAL

[76] Inventor: Anthony V. Ceaser, P.O. Box 161, Great Meadows, N.J. 07838

[21] Appl. No.: 17,845

[22] Filed: Feb. 24, 1987

[51] Int. Cl.$^4$ ..................... C08G 1/00; C08G 18/00; C08F 216/08

[52] U.S. Cl. ..................... 527/300; 527/312; 525/54.3; 525/54.31

[58] Field of Search ................ 527/300, 312; 524/27, 524/35, 47; 428/317.1; 525/54.3, 54.31

[56] References Cited

U.S. PATENT DOCUMENTS 4,464,523  8/1984  Neigel et al. ........................ 527/300

Primary Examiner—John Kight
Assistant Examiner—Nathan M. Nutter
Attorney, Agent, or Firm—Omri M. Behr

[57] ABSTRACT

The present invention relates to a water-repellent polymeric carbohydrate composition, wherein a substantial number of the hydroxyl groups of the carbohydrate moieties are reacted with a metal/ammonium complex. The composition of this invention finds particular utility as an oil absorbent, and can also be utilized in other applications where a water-repellent cellulose is necessary, i.e., water-repellent insulation, water-repellent papers, etc.

Additionally, this invention relates to a method for producing a water-repellent composition and to a method for utilizing the water-repellent composition as an oil-absorbent in applications where an oil-absorbency and a water-repellency is desirable.

34 Claims, No Drawings

OIL SPILL ABSORBENT MATERIAL

BACKGROUND OF THE INVENTION

The recovery and disposal of petroleum, especially petroleum crude that is spilled at sea is a very serious problem. Failure to control the spilled oil can lead to the contamination of miles of shoreline with concommitant damage to natural flora and fauna, as well as to types of man-made installations that are built into the water.

Numerous methods have been devised for the cleanup of such oil spills. Surfactants have been applied to the oil to disperse it, but these are usually so rapidly diluted by the sea currents that they are ineffective. Absorbent materials which are heavier than water have been used to absorb the oil, but these sink to the bottom, and retain the oil at the bottom of the sea. This results in a slow liberation of the oil, damage to the flora and fauna at the sea bottom and pollution over a greater distance. Absorbent materials which do not sink in the water have most advantageously been utilized, typically in a sock type contaner for use as a boom. However, most of these also absorb water and thus do not perform in a completely satisfactory manner.

SUMMARY OF THE INVENTION

The composition of the present invention comprises a substantially dry hydrophobic, lipophilic absorbent material comprising: an absorbent substrate comprising substantially a polymeric carbohydrate in powder, granular or fibre form and a complex reacted therewith, said complex being formed from (b) at least one fatty acid having from 12 to 20 carbon atoms; and (c) at least one water-soluble hydroxide or oxide or salt, suitably the carbonate, sulfate, acetate or chloride salt of the group of metals which form coordination complexes with substituted or unsubstituted ammonium ion; (d) an ammonium ion donor; (e) a catalytic amount of a strong alkaline metal hydroxide; and sufficient water to solubilize the metal salt, the ammonium ion donor and the strong alkali metal hydroxide; the resultant mixture is then dried.

The composition of the present invention may then be utilized to absorb water-insoluble organic liquids, particularly oil spills. A method of the present invention thus comprises contacting the surface layers of the water-insoluble organic liquid floating on water, such as oil, with a composition of the present invention, absorbing the organic liquid thereon, and removing the resultant absorbed composition.

DETAILED DESCRIPTION OF THE INVENTION

The fibrous substrate utilized in the present invention can be derived from cellulose, wool or other fibrous material having an active hydroxyl group. When it is derived from cellulose, the fibrous substrate to be utilized comprises hydrophilic cellulose fibers derived from any cellulose-containing naturally occurring material, such as wood, cotton, straw, grass, bast, ramie, linen, bagasse, hemp, sisal or jute. Cellulose pulp fibers liberated from lignocellulosic material by any pulping process such as chemical cellulose fibers, mechanical lignocellulose fibers, chemi-mechanical fibers, semi-mechanical fibers, and reject fibers from pump mills or paper board mills are particularly preferred. Peat fibers liberated from matured peat can also be used.

The fibrous substrate may comprise from about 50 to about 80% w/w suitably about 60% w/w of the final product.

Where high purity is required in the substrate, powdered or granular starch may be similarly employed.

The fatty acid having from 12 to 20 carbon atoms may be selected from any of the saturated or unsaturated fatty acids, such as lauric acid, myristic acid, palmitic acid, stearic acid, oleic acid, ricinoleic acid, linoleic acid, linolenic acid, as well as the mixed fatty acids derived from tallow, coconut oil, linseed oil, cottonseed oil, corn oil, fish oil, peanut oil, soyean oil, safflower oil and other vegetable and animal oils.

The fatty acid may comprise from about 2 to about 3.5 mole % suitably about 5 mole % of the complex.

The water-soluble hydroxide or oxide, or salt such as the acetate, carbonate, sulfate, nitrate or chloride of the group of metals which form coordination complexes with the ammonium ion is selected from any of the various salts which perform this function, for instance, the hydroxides, oxides, carbonates, sulfates and chlorides of copper, cobalt, zinc, chromium, and zirconium. Of these the hydroxides, oxides and carbonates of copper, cobalt, zinc, chromium and zirconium are preferred. Especially preferred are the hydroxides, oxides and carbonates of zinc and copper.

The metals may comprise from about 5% to about 40 mole % suitably about 20 mole % of the complex.

The ammonium ion donor may be any compatible ammonium source for example, ammonium hydroxide, or a salt such as ammonium carbonate, chloride or sulfate or a volatile organic amine. The function of the ammonium ion donor is when combined with water to immediately form, in situ, a coordination complex with the metal ion. This metal-ammonium complex, in combination with the fatty acid, reacts with the three reactive hydroxyl groups on the cellulose molecule to impart water-repellency and oil-affinity to the cellulose fibers. It is of interest to note that while the presence of an ammonium ion donor is required for the formation of the product of the present invention, analysis of the product does not show the presence of any nitrogen. Further, if an ammonium complex is formed with the metal while not in contact with the fatty acid and the substrate, the desired product is not formed.

The ammonium ion may be used in the form

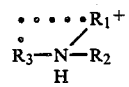

wherein $R_1$, $R_2$ and $R_3$ are hydrogen or lower alkyl of 1-5 carbon atoms or where $R_1$ and $R_2$ are joined together there is formed a nitrogen containing heterocycle of 5-8 members and having 0 or 1 additional heteroatoms in the ring selected from the group consisting of N, S, or O.

The ammonium ion may exist as the ion derived from primary amines such as ethylamine or n-butylamine, as secondary amines such as diethylamine or dipropylamine, as tertiary amines such as trimethyl amine. As heterocycles there may be used saturated, unsaturated and aromatic heterocycles such as pyrrolidine, piperidine, piperazine, morpholine, 2-pyrroline, indoline, imidazoline, pyridine, isothiazole and indole. These are listed purely for exemplification and not as limitations of scope of the invention. The ammonium (as ammonia) may comprise from about 30 to about 90 mole % suitably about 75 mole% of the complex.

The reaction between the metal-ammonium complex, the fatty acid and the carbohydrate moieties is suitably, but not critically, catalyzed by the addition of a strong alkali metal hydroxide in a solution of water. Typically, sodium or potassium hydroxide is utilized due to their availability and cost, but others may also be utilized with equal facility.

The alkali metal hydroxide may comprise from about 0.2 to about 0.5 mole % suitably about 0.1 mole % of the complex.

The amount of water is selected so as to solubilize the metal salt, the ammonium ion donor and the alkali metal hydroxide.

Typically, the composition of the present invention is produced by mixing together, in solid, dry form, the cellulose, wool or other fibrous material, the metallic salt, the ammonium ion donor and the fatty acid.

There are several modes in which this procedure may be carried out. The substrate can be mixed with the fatty acid per se or the metal source per se or with both together; the first and third alternatives being preferred due to the substantial water insolubility of fatty acids. If the ammonium donor is solid and dry it may be added to any one of the foregoing three mixtures.

If either the acid or the metal is not initially mixed in, or if the ammonium donor to be used is not solid, then the omitted components are mixed with the aqueous phase, which preferably, but not critically will include a catalytic amount of a strong alkali metal hydroxide dissolved in the water and sprayed into the agitated mixture. Usually a ratio of 1 part by weight of water to 2 parts by weight of substrate is employed. The resultant mixture is then dried and is ready for usage. The reaction is normally somewhat exothermic, thus usually more continued agitation for from about 15 to about 60 minutes is usually sufficient to produce substantially dry material. External drying sources such as external application of heat, injection of dry air or hot dry air or any other drying means known to the art may be used.

In a related embodiment, larger amounts of water, say up to a ratio of 4 parts by weight of water to 1 part by weight of substrate may be employed than are needed to solvate the complex components. The thus produced "mush" is then extruded into fibers, thin strips, tubules, granules or the like, which are then dried. Such a format is preferred when dust formation may be a problem.

The absorbent composition normally is used in granulated or shredded form. The fibrous composition can be granulated or shredded after preparation using conventional granulating or shredding apparatus. The resulting fibers can be assembled as a mass on water with the aid of a floating boom or other means, and guided towards the floating liquid to be absorbed.

An important feature of the composition of the present invention is that the water repellency of the composition is retained even after contact with organic solvents. This means that the composition can be used to absorb oil with the oil then being extracted from the composition with suitable organic solvents, thus enabling the reuse of the composition. This stability to solvent extraction indicates that the fatty acid has chemically reacted with the fibrous composition and is not merely a surface modification as in the prior art. This stability is additionally important because it means that the water-repellency of the composition is retained in applications where contact with organic solvents can be expected, e.g., spill clean-up. Tests, using various organic solvents such as aliphatic, aromatic and chlorinated solvents, have been run on the compositions of the present invention which indicated that up to 10 consecutive extractions with organic solvents did not appreciably affect their water repellency.

The fibrous embodiment of the present invention can be additionally utilized in the manufacture of water-repellent paper goods by utilizing the fibers as substrate for a further manufacturing process. Thus, the granules or shredded form can be used in conventionally manufacturing processes to form water-repellent goods such as cardboard, paper plates, etc.

The absorbent composition of the present invention is advantageously stable over a period of at least twelve months. When tested in cellulose waterproofing tests, samples that had been stored for nine (9) months showed no difference in water-repellency from freshly made samples.

The following Examples describe in detail the compositions and processes of the present invention. It will be apparent to those skilled in the art that many modifications, both of materials and methods, may be practiced without departing from the purpose and intent of this disclosure.

EXAMPLE I 50.0 kg. fine ground waste paper
1.5 kg. zinc oxide
5.0 kg ammonium carbonate
1.5 kg, stearic acid
0.1 kg. sodium hydroxide
25.0 kg. water The first four ingredients are added dry to a high speed powder mixer of the vertical screw type running at about 250 rpm and blended. The sodium hydroxide is then dissolved in the water and added as spray to the circulating mixture. After about 30 minutes of agitation after the water/sodium hydroxide addition is complete the product is sufficiently dry to pack off.

This product "wets out" in fresh or salt water only after 144-400 hours, as compared to unmodified cellulose fiber which wets out in 1-5 minutes.

EXAMPLE II 50.0 kg. fine ground cotton fiber
1.8 kg. copper carbonate
1.5 kg. myristic acid
4.5 kg. ammonium hydroxide
0.1 kg. potassium hydroxide
22.0 kg. water The dry cotton fiber, copper carbonate and myristic acid are combined and blended. The ammonium hydroxide, potassium hydroxide and water are then added as a spray to the circulating mixture as in Example I. After about 30 minutes of further agitation the mixture is dry enough to pack off.

EXAMPLE III 100.0 kg. Wood flour
1.3 kg. oleic acid
2.1 kg. Chrome alum
5.0 kg. ammonium hydroxide
0.1 kg. sodium hydroxide
35.0 kg. water The first two ingredients are added dry to a high speed powder mixer of the vertical screw type running at about 250 rpm and blended. The remaining three components are then dissolved in the water and added as spray to the circulating mixture. After about 30 minutes of agitation after the water/sodium hydroxide addition is complete, the product is sufficiently dry to pack off.

This product "wets out" in fresh or salt water only after 144-400 hours, as compared to unmodified cellulose fiber which wets out in 1-5 minutes.

EXAMPLE IV 100.0 kg. Wood flour
2.1 kg. Chrome alum
1.3 kg. oleic acid
5.0 kg. ammonium hydroxide
0.1 kg. sodium hydroxide
35.0 kg. water The dry wood flour, chrome alum and oleic acid are combined and blended. The ammonium hydroxide, sodium hydroxide and water are then added as a spray to the circulating mixture as in Example I. After about 30 minutes of further agitation the mixture is dry enough to pack off.

EXAMPLE V 100.0 kg. ground corn cob
1.65 kg. coconut fatty acid
1.85 kg. copper sulfate
8.0 kg. morpholine
0.25 kg. sodium hydroxide
25.0 kg. water The first two ingredients are added dry to a high speed powder mixer of the vertical screw type running at about 250 rpm and blended. Ingredients 3,4 & 5 are then dissolved in the water and added as spray to the circulating mixture. After about 30 minutes of agitation after the water/sodium hydroxide addition is complete, the product is sufficiently dry to pack off.

This product "wets out" in fresh or salt water only after 144-400 hours, as compared to unmodified cellulose fiber which wets out in 1-5 minutes.

EXAMPLE VI 100.0 kg. ground corn cob
1.65 kg. coconut fatty acid
1.85 kg. copper sulfate
8.0 kg. morpholine
0.25 kg. sodium hydroxide
25.0 kg. water The dry corn cob, copper sulfate and fatty acid are combined and blended. The morpholine sodium hydroxide and water are then added as a spray to the circulating mixture as in Example I. After about 30 minutes of further agitation the mixture is dry enough to pack off.

EXAMPLE VII 100.0 kg. Cold-water soluble Potato Starch
5.0 kg. copper hydroxide
5.0 kg. stearic acid
25.0 kg. ammonium hydroxide
10.0 kg. water The potato starch, copper hydroxide and stearic acid are combined and blended. The ammonium hydroxide and water are then added as a spray to the circulating mixture as in Example I. After about 30 minutes of further agitation the mixture is dry enough to pack off.

EXAMPLE VIII

Kerosine Pickup

A test tank 3 m×3 m×1 m deep is filled to a depth of about 50 cm with water and 10 liters of kerosine is floated thereon. 1 kg of cellulose treated in accordance with example I is added and swept across the water surface with a floating boom. All of the kerosine is absorbed and the absorbent material is then scooped up. The kerosine is recovered by distillation under reduced pressure.

In accordance with the above procedure, but in place of kerosine, there may be employed Bunker C fuel oil, toluol or trichloroethylene which are all similarly absorbed.

Utilizing the above procedure, similar results are obtained using any of the other absorbents produced by Example II through VII, in place of that of Example I

Comparative Testing

Samples were prepared in accordance with Example 11 of Hoechst German OLS 23 58 808. These samples when exposed to water became waterlogged in 5 minutes. Extraction with 1,1,1-trichloroethane removed 75% of the chromium originally added to the substrate.

Further samples were prepared in accordance with the Quilon (TM) Bulletin published by the manufacturer, Dupont. The product, prepared using hexamethylenetetramine as the complexing amine at pH 3, yielded a product which became waterlogged in 1.5 hours and similarly, extraction with 1,1,1-trichloroethane removed 75% of the chromium originally added to the substrate.

Absorbency Testing

Cellulose treated in accordance with Example I is preweighed and packed loosely into a flat bottomed box equipped with a drain. Kerosine was dripped into the box until it appeared that no more was being absorbed, ie there was a wet appearence. The box was then tilted at 35° to the horizontal and all surplus kerosine drained off. The contents of the box were then weighed. The amount of kerosine absorbed was 10 times the weight of the cellulose.

The foregoing experiment was repeated for Bunker C fuel oil, toluol and trichloroethylene. The pick up was 14×, 9× and 12× the weight of the cellulose respectively. Similar results are obtained using any of the other absorbents produced by Example II through VII.

I claim:

1. A process for the preparation of a hydrophobic, lipophilic absorbent material which comprises mixing:
   (a) the absorbent substrate comprising substantially of a polymeric carbohydrate in powder, granular or fibre form,
with at least one component selected from a set consisting of
   (b) at least one a fatty acid having from 12 to 20 carbon atoms;
   (c) at least one water soluble hydroxide, oxide, or salt of the group of metals which form complexes with an ammonium ion and
   (d') an ammonium ion donor in dry solid form, and adding thereto at least one component selected from group (b) or group (c) provided that a component of the group selected had not been previously admixed;
(d") an ammonium ion in liquid phase provided a component of group (d') had not been previously admixed and
(e) sufficient water to solubilize said added components when water soluble, and drying the resultant mixture.

2. A process according to claim 1 further comprising adding (f) a catalytic amount of a strong alkali metal hydroxide in the second stage of the process.

3. A process according to claim 1, wherein at least one component of each of groups (a) through (d') are dry-mixed together, the water of (e) added thereto and the total mixture dried.

4. A process according to claim 1, wherein at least one component of each of groups (a), (b) and (c) are dry-mixed together, the water of (e) added thereto together with at least one component selected from the set consisting of groups (d') and (d") and the total mixture dried.

5. A process according to claim 1, wherein at least one component of each of groups (a), (b) and (d') are dry-mixed together, the water of (e) added thereto together with at least one component selected from the group (c) and the total mixture dried.

6. A process according to claim 1, wherein at least one component of each of groups (a), (c) and (d') are dry-mixed together, the water of (e) added thereto together with at least one component selected from the group (b) and the total mixture dried.

7. A process according to claim 1, wherein the second step comprises spraying the aqueous phase into the agitated mixture of components of the first step.

8. A process according to claim 1, wherein the absorbent material is a fibrous cellulose material.

9. A process according to claim 1, wherein the fatty acid is stearic or myristic acid.

10. A process according to claim 1, wherein the metal oxide is zinc oxide.

11. A process according to claim 1, wherein the metal salt is copper sulfate or copper carbonate.

12. A substantially dry hydrophobic, lipophilic absorbent material comprising:
(a) an absorbent substrate comprising substantially of a polymeric carbohydrate in powder, granular or fibre form,
previously reacted with
(b) at least one fatty acid having from 12 to 20 carbon atoms;
(c) at least one water soluble hydroxide or oxide, or salt of the group of metals which form complexes with ammonium ion;
(d) an ammonium ion donor; and
(e) sufficient water to solubilize (c) and (d) in accordance with the procedures of claim 1,
said reacted material having been dried after reaction.

13. A substantially dry hydrophobic, lipophilic absorbent material prepared in accordance with the procedures of claim 2.

14. An absorbent material of claim 12 wherein the ammonium ion is substituted in the form

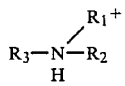

wherein $R_1$, $R_2$ and $R_3$ are hydrogen or lower alkyl of 1–5 carbon atoms or where $R_1$ and $R_2$ are joined together there is formed a nitrogen containing heterocycle of 5–8 members and having 0 or 1 additional heteroatoms in the ring selected from the group consisting of N, S, or O.

15. An absorbent material of claim 12 wherein the substrate is in fibrous form.

16. An absorbent material of claim 12 wherein the ammonium ion donor is aqueous ammonia.

17. An absorbent material of claim 12 wherein the ammonium ion donor is aqueous morpholine.

18. An absorbent material of claim 12 wherein the ammonium ion donor is aqueous pyridine.

19. An absorbent fibrous material of claim 12 comprising:
from about 50 to about 80% w/w of fibrous material of (a),
from about 5 to about 15% w/w of components (b) thru (e) of the complex
and water to 100%.

20. A material of claim 12, wherein the mole ratios of: (b) as acid: (c) as metal ion: (d) as ammonium are from 2 to 5%: from 5 to 40%: from 30 to 90%.

21. A material according to claim 12, wherein the absorbent material is a fibrous cellulose material or starch.

22. A material according to claim 12, wherein the fatty acid is stearic or myristic acid.

23. A material of claim 12 wherein the metal is zinc, copper or chromium.

24. A material of claim 12 wherein the anion of the metal salt is selected from the group consisting of sulfate, chloride, nitrate carbonate and acetate.

25. A material according to claim 12, wherein the metal oxide is zinc oxide.

26. A material according to claim 12, wherein the metal salt is copper carbonate or copper sulfate.

27. A process for the absorption of surface layers of water-insoluble organic liquids floating on water which comprises contacting the surface layer with water-repellent fibrous material of claim 1.

28. A process according to claim 27, wherein the water-insoluble organic liquid is a petroleum oil.

29. A process according to claim 27, wherein the fibrous material is a fibrous cellulose material.

30. A process according to claim 27, wherein the fatty acid is stearic or myristic acid.

31. A process according to claim 27, wherein the metal oxide is zinc oxide.

32. A process according to claim 27, wherein the metal salt is copper sulfate or copper carbonate.

33. A water-repellent fibrous cellulose material of claim 12 wherein a sufficient amount of water is used in (e) to form an extrudable mass, said mass having been extruded and the extrudate dried.

34. A water-repellent fibrous cellulose material forming process of claim 1 wherein a sufficient amount of water is used in (e) to form an extrudable mass, said mass is extruded and the extrudate dried.

* * * * *